United States Patent
Moser et al.

(10) Patent No.: US 10,618,200 B2
(45) Date of Patent: Apr. 14, 2020

(54) PULTRUSION APPARATUS

(71) Applicants: Hexcel Composites GMBH & Co KG, Neumarkt (AT); Hexcel Composites Limited, Duxford (GB)

(72) Inventors: Johannes Moser, Pasching (AT); Marco Arcidiacono, Duxford (GB); Francesco De Giorgi, Duxford (GB); Vithaldas Guru, Pasching (AT); Owen Hung, Duxford (GB)

(73) Assignees: HEXCEL COMPOSITES GMBH & CO KG, Neumarkt (AT); HEXCEL COMPOSITES LIMITED, Duxford, Cambridgeshire (GB)

( * ) Notice: Subject to any disclaimer, the term of this patent is extended or adjusted under 35 U.S.C. 154(b) by 285 days.

(21) Appl. No.: 15/548,903

(22) PCT Filed: Feb. 10, 2016

(86) PCT No.: PCT/EP2016/052856
§ 371 (c)(1),
(2) Date: Aug. 4, 2017

(87) PCT Pub. No.: WO2016/128485
PCT Pub. Date: Aug. 18, 2016

(65) Prior Publication Data
US 2018/0021983 A1    Jan. 25, 2018

(30) Foreign Application Priority Data

Feb. 13, 2015 (EP) .................................... 15155136
Dec. 21, 2015 (EP) .................................... 15201578

(51) Int. Cl.
*B29B 15/14* (2006.01)
*B29C 70/52* (2006.01)
*B29B 15/12* (2006.01)

(52) U.S. Cl.
CPC .......... *B29B 15/122* (2013.01); *B29C 70/523* (2013.01)

(58) Field of Classification Search
None
See application file for complete search history.

(56) References Cited

U.S. PATENT DOCUMENTS

| | | | | |
|---|---|---|---|---|
| 3,556,888 | A | * | 1/1971 | Goldsworthy ......... B23Q 7/042 156/73.2 |
| 5,114,633 | A | * | 5/1992 | Stewart ................. B29B 15/122 156/180 |
| 5,492,583 | A | * | 2/1996 | Fingerson ................. B05C 3/12 118/124 |

FOREIGN PATENT DOCUMENTS

| | | |
|---|---|---|
| DE | 102012013448 A1 | 5/2014 |
| NL | 8104019 | 3/1983 |

(Continued)

OTHER PUBLICATIONS

English Abstract of DE102012013448 (A1).
Abstract of NL8104019.

*Primary Examiner* — Jeffry H Aftergut
(74) *Attorney, Agent, or Firm* — W. Mark Bielawski; David J. Oldenkamp

(57) ABSTRACT

The present invention defines a pultrusion apparatus. The apparatus comprises a portion for receiving fibres, a portion for injecting resin into the fibres, a portion for impregnating the resin injected fibres, and a portion for shaping the impregnated fibres, wherein the fibres, following their passage through the receiving portion, converge in the resin injection portion to receive the resin and the resin flows outwards following injection as the fibres progress from the injection portion through the impregnation portion.

12 Claims, 4 Drawing Sheets

(56) References Cited

FOREIGN PATENT DOCUMENTS

WO 2014/087114 A1 6/2014
WO 2014/140025 A1 9/2014

* cited by examiner

PULTRUSION APPARATUS

FIELD OF INVENTION

The invention relates to a pultrusion apparatus, an inlet or spreader for a pultrusion apparatus or process, a pultrusion process, a pultruded product and the use thereof, particularly but not exclusively the invention relates to an apparatus, inlet, process, and product including their uses for producing fibre reinforced pultrusion for use in wind energy applications such as wind turbine blades.

BACKGROUND OF THE INVENTION

Composite materials containing both a fibrous reinforcement material and a resin matrix or resin, have become of increasing importance. Such materials combine an excellent strength with a very low weight, which makes them the first choice for weight-sensitive applications, in particular in the aircraft and energy industries.

There are numerous methods for the fabrication of composite structures, including but not limited to thermoforming polymeric matrices and autoclave processing. However, all are either labor intensive, more costly than using purely metallic materials, not applicable to moderate to high volume applications, or do not result in structurally efficient structures having a desired strength to weight ratio.

NL8104019 discloses a process for producing wind turbine blades from composite material comprising extruded cured fibre reinforced elements in combination with conventional composite materials comprising a resin matrix in combination with a fibrous reinforcement material.

Conventional pultrusion processing methods have moderate production rates for heat-cured, pultruded, composite structures. However, generally, a limitation of pultrusion processes is that a pultrusion process is adapted only to produce elongated parts of uniform cross-section. This is due in part to the nature of the process itself. Because the process operates by pulling long continuous reinforcing fibres through the various unit operations, it naturally forms elongated composites in which the reinforcing fibres are aligned in the direction of the pultrusion.

In the production of pultruded composite structures thermoplastic and thermoset resin matrices are widely used. For structural applications, thermoset resin such as epoxy, vinylester, polyester and polyurethane resins are better suited as they provide structurally efficient composite structures which have a better mechanical performance to weight ratio than comparable structures manufactured from thermoplastic resins. Once cured, thermoset resins cannot be subsequently thermoformed or shaped in any other manner, yet it is necessary to cure the thermoset resin in the die in order to bind the fibres together and to create the desired cross-sectional shape.

Usually, in these processing methods a resin system is employed that sacrifices structural performance for rapid processing. Therefore, conventional pultruded structures are generally unsuitable for primary structural applications due to their less than optimal structural performance. Lower structural performance is due to non-optimal fibre orientations in the fabric and the necessity of using rapid curing resins that have non-optimal structural performance. Incomplete impregnation of resin in the fibre and also moisture which leads to voids in laminates are common problems in conventional pultrusion methods. Wear and tear of the pultrusion apparatus is also an issue with conventional pultrusion systems, particularly wear and tear caused by the contact of abrasive fibre materials with the walls of the apparatus. Very high pullforces may also be required to pull the fibre through the pultrusion apparatus, and difficulties in maintaining a constant rate of fibre flow through the apparatus with such high pullforces may lead to inconsistencies in resin impregnation into the fibre and/or reductions in surface quality.

The invention aims to obviate or at least mitigate the above described problems and/or to provide improvements generally.

SUMMARY OF THE INVENTION

According to the invention, there is provided an apparatus, a process, a product and a use as defined in any one of the accompanying claims.

In one aspect of the invention there is provided a pultrusion apparatus comprising: a portion for receiving fibres; a portion for injecting resin into the fibres; a portion for impregnating the resin injected fibres, and a portion for shaping the impregnated fibres, wherein the fibres meet in the resin injection portion.

The individual portions comprised in the apparatus of the present invention may be present as clearly separated portions, or individual portions may be immediately adjacent to one or two other portions. In some embodiments, one or more portions may at least partly coincide. For example, the portion for injecting resin into the fibres may at least partly coincide with the portion for receiving fibres and/or the portion for impregnating the resin injected fibres; and/or the portion for impregnating the resin injected fibres may at least partly coincide with the portion for injecting resin into the fibres and/or the portion for shaping the impregnated fibres.

The injection portion may comprise a resin injection device. The fibres preferably converge in an injection zone adjacent the injection device. This allows the fibers to be directly wetted out with resin.

The resin flows from the injection zone outwards as the fibres progress from the injection portion through the impregnation portion. Preferably the resin is polyurethane.

In one embodiment, the injection device guides the fibres to the injection zone.

In another embodiment, the receiving portion may comprise an inlet for receiving and spacing the fibres and locating the fibres in relation to one another. The inlet may guide the fibres to the injection zone.

In a preferred embodiment, the fibres are in the form of fibre tows, each tow comprising multiple fiber filaments. Typically a tow may comprise from 20,000 to 60,000 filaments, preferably from 50,000 to 60,000 filaments. Preferably the fibre is carbon fibre.

As fibers are pulled through the various portions of the apparatus from the receiving portion through to the shaping portion, a surfacing material, such as a veil or peel ply, may be applied to one or more portions. The surfacing material protects the various portions from wear and tear as they prevent or reduce the contact between the fibres which may be abrasive, and surfaces of the portions. In addition, the surfacing material may provide a desired surface quality on the pultruded fibres. Desired surface qualities may comprise surface roughness, or a surface structure (which may include channels, undulations). In a preferred embodiment the surfacing material comprises a veil having a weight in the range of from 5 to 60 g/m$^2$, preferably from 5 to 40 g/m$^2$ and more preferably from 10 to 25 g/m$^2$, and/or a peel ply having a weight in the range 50 to 150 g/m$^2$, preferably 80 to 120 g/m². The surfacing material may be removable from the pultruded fibres following their cure.

In a preferred embodiment a first surfacing material, such as a veil or peel ply, is applied to the receiving portion and a further surfacing material is applied to the injection portion and/or impregnation portion. The first surfacing material may be provided below the fibres and the further surfacing material may be provided above the fibres.

In a preferred embodiment the impregnation portion decreases in cross-sectional area along its length in extending to the shaping portion, so that as the fibres pass through the impregnation portion from the injection portion to the shaping portion the pressure in the impregnation portion increases, assisting the impregnation of the resin into the fibres. In particular, the impregnation portion narrows in at least one dimension in the direction of the shaping portion.

In a particular preferred embodiment, the present invention provides a pultrusion apparatus comprising:

a) an inlet or inlet plate comprising openings for insertion of fibre;

b) a device for impregnating the inserted fibre with resin;

c) a device for shaping the resin impregnated fibre; and d) a device for pulling the fibre through the apparatus;

wherein the device for impregnating the fibre with resin is positioned centrally with respect to the inlet plate for insertion of the fibre.

The present invention also provides an inlet for a pultrusion apparatus, wherein the inlet plate comprises one or more openings arranged in an oscillating lattice.

The present invention further provides a process for manufacturing pultruded resin reinforced fibres, comprising the steps of receiving fibres in a fibre receiving portion of an apparatus, injecting resin into the fibres in a resin injection portion of said apparatus, impregnating the resin injected fibres in an impregnation portion of said apparatus, and shaping the impregnated fibers in a shaping portion or die portion to form the pultrusion, wherein the received fibres meet or converge in the resin injection portion.

In a further particular embodiment, the present invention further provides a process for pultrusion of fibre, wherein the process comprises:

a) inserting fibre into a chamber;

b) impregnating the inserted fibre with resin in the chamber;

c) shaping the resin impregnated fibre; and d) pulling the fibre through the chamber;

wherein the fibre is impregnated with resin centrally in the chamber.

The process can also use the apparatus of the present invention.

The present invention further provides the use of a porous surfacing material in a process for manufacturing pultruded resin reinforced fibres in a pultrusion apparatus to provide protection to the pultrusion apparatus or parts thereof and/or to provide a desired surface quality to the pultruded resin reinforced fibres, optionally whilst allowing resin injection into the fibres through the surfacing material.

In this way the present invention provides an apparatus and an efficient process for producing high performance pultruded products, which overcome the problems of the prior art apparatus and processes and which can produce high performance structural profiles which satisfy the requirements of composites used in the aerospace or wind energy industries.

DETAILED DESCRIPTION OF THE INVENTION

Pultrusion Apparatus

The pultrusion apparatus comprises a portion for receiving fibres, a portion for injecting resin into the fibres, a portion for impregnating the resin injected fibres, and a portion for shaping the impregnated fibres. The portions are preferably integrated. Preferably the portions are arranged so that fibres progress through the respective portions consecutively. We will now discuss more detailed aspects of each of these portions as follows.

Inlet, Inlet Plate or Spreader

Any fibre in the form of fibre tows comprising multiple filaments may be used in the pultrusion apparatus. Preferably, the fibre tows comprise carbon fibre tows. The receiving portion preferably comprises an inlet, or inlet plate or spreader. Preferably, the fibres in the form of tows are spaced and located in the receiving portion. The inlet for the pultrusion apparatus of the present invention comprises openings for receiving and locating the fibres in relation to subsequent portions. The openings may be arranged in the form of a grid so that fibres can be passed through the inlet in an arranged and spaced manner. The openings can for example be rectangular shaped, including square shaped, and may also be equidistant or at varying distance from one another and of equal or varying size, preferably the openings being in the form of a grid. The spreading of the fibres allows the fibres to converge in the injection portion so that the resin can penetrate or wet them out more efficiently. This can be beneficial when using carbon fibres, which, due to the size and packing of their filaments can be difficult to wet out. Effective wetting out leads to faster production rates and also reduces the time of resin exposure to air which could affect the quality of the resin.

Preferably the inlet comprises an oscillating lattice arrangement. This helps to ensure that fibres are fed through openings without an accumulation of fuzz at the inlet openings. Such fuzz may get periodically drawn into other parts of the apparatus and result in defects in the apparatus and/or the pultruded product. Preferably the oscillating lattice arrangement is provided by oscillating combs. These may be arranged at 90° to each other to create a lattice pattern with the same geometry as the inlet to feed the fibre through. There may be one or more vertical combs and one or more horizontal combs comprising a plurality of pins. Movement of the combs may be controlled by one or more motors, for example a horizontal movement motor and/or a vertical movement motor.

Preferably the inlet is centrally positioned in relation to the injection portion.

Device for Resin Injection

The portion for injecting resin into the fibres may comprise a resin injection device. Once the fibre is inserted through the receiving portion such as an inlet, it can then be brought into contact with the resin injection device. The device may guide the fibres to an injection zone with the fibres converging in the injection zone adjacent the injection device. The device may comprise a resin injector. The device is preferably positioned centrally with respect to the inlet or in respect of the flow direction of the fibres through the impregnation portion. Such central positioning allows the resin to be injected into peripherally arranged fibres as they pass through the apparatus so that fibres are impregnated from the centre to their outside. This ensures that air moves only in one direction leading to more efficient impregnation. The nozzle of an injector could be any number of shapes including flat, wide or large aspect ratio, i.e. slot-shaped, to produce a thin film of resin. Alternatively or additionally, a resin injector may comprise multiple exit ports to shape the resin extruded therefrom. For example, 3 exit ports, each of which may each be generally circular or generally slot-shaped, may be arranged next to each other, so that the flow of resin from the injector is in the form of a wide film. A wider extruded film of resin will mean the resin has to travel less distance into the fibres. This could improve wetting out, impregnation, and speed these up, enabling faster production rates. Preferably, the shape of the extruded resin at least partially matches the shape of the pultruded product to be formed in the pultrusion apparatus. The resin can be any thermosetting resin, but preferably is polyurethane.

Preferably the device for injecting the resin is in a chamber and said device is positioned centrally within said resin injection portion or said chamber. Moisture resulting from open air resin impregnation can lead to a decrease in product surface quality and in the case of thermoset polymers such as polyurethane these tend to foam excessively if exposed to water vapour in air. Hence, the device being positioned within such a closed container avoids these problems and results in better finished product quality. The chamber can be made of a number of materials, but preferably is made of metal.

The central positioning of the device within the resin injection portion or chamber further ensures efficient impregnation of the inserted fibres. The device or the chamber within which the device lies can also be positioned at an angle relative to the longitudinal direction of movement of the fibres in the injection portion, preferably an angle of 0.5 to 2.5°, such as 0.9 to 1.1°.

The apparatus may also comprise one or more resin injectors which are positioned downstream of the first device for impregnating fibre with resin.

Additionally or alternatively to the generally central injection of resin, resin may be injected peripherally. Where resin is injected peripherally and centrally, it may be injected either at the same position as the centrally injected resin or downstream therefrom.

Resin Impregnation Portion

As the wetted out fibre is moved through the resin injection portion, pressure is exerted on the wetted out fibre by the walls thereof, which causes the fibres to be fully wetted out. The apparatus is configured so that resin flows outwards from the central point of injection as the fibres progress from the injection portion through the impregnation portion. The impregnation portion within the apparatus may also comprise a cooling zone for cooling the resin, preferably before the portion for shaping the resin impregnated fibre (die).

The impregnation portion may have a smaller total volume than the injection portion and/or the cross-sectional area of at least part of the resin impregnation portion may be smaller than the cross-sectional area of the injection portion. In this respect the impregnation portion may have smaller or narrower dimensions such as height, width or circumference and hence be a narrower pathway through which injected fibre can pass. This increases the pressure with which the resin is forced into the fibres and as a result the degree of impregnation can be increased. The design is such that the fibres and resin are forced to pass through a smaller volume and/or narrower space so that resin is squeezed into the fibres and fibre volume fraction is increased. Said smaller volume and/or narrower impregnation portion may also be followed by a buffer area which gradually increases in volume and/or cross-sectional area until it reaches the desired final profile volume and/or cross-sectional area and the shaping portion.

The length of the impregnation portion is not especially limited, but preferably it is of sufficient length in the direction in which the fibre is pulled so that a sufficient quantity of resin is impregnated into the fibres during their passage through the impregnation portion such that the desired pultruded composite product will be formed by passage of the resin impregnated fibres through the shaping portion. The length may be adjusted to take into account the size and shape of the final product, the resin and fibres used, the rate at which the fibres are pulled through the apparatus, and/or the temperatures used. However, in at least some embodiments the length of the impregnation portion is from 100 to 1500 mm, preferably from 250 to 1000 mm, more preferably from 400 to 800 mm.

The cross-sectional shape of the impregnation portion may remain generally constant along its length or it may vary. For example, the cross-sectional shape may change along the length of the impregnation portion, e.g. the impregnation portion may have a generally round or square cross-section at the end closest to the injection portion but this may change to a generally rectangular cross-section at the end closest to the shaping portion. Similarly, the cross-sectional area of the impregnation portion may reduce along its length extending to the shaping portion, so that the volume of a unit length of the impregnation portion decreases along its length, and so that the impregnation pressure increases along its length. The decrease in cross-sectional area, and therefore volume of a unit length, in the impregnation portion may be regular or irregular; for example, the cross-sectional area may decrease along the entire length, either at a constant rate of decrease or at a variable rate and, optionally, regions in which the cross-sectional area does not change may be present. Alternatively, the cross-sectional area of the impregnation portion may decrease overall along its length, but may increase in at least one region, for example due to the presence of a region having a greater cross-sectional area than the preceding and subsequent regions. Thus, the resin impregnation portion may include two or more regions of different impregnation pressure. One or more vents allowing resin not impregnated into fibres to escape from the impregnation portion before entry of the resin impregnated fibres into the shaping portion may also be present along the length of the resin impregnation portion.

Preferably the cross-sectional shape of at least the final part of the impregnation portion corresponds at least generally to the cross-sectional shape of the shaping portion, to facilitate transfer of impregnated fibres from the impregnation portion to the shaping portion, although the dimensions of the cross-sectional shapes may differ. For example, if the shaping portion is adapted to shape the resin impregnated fibres to a rectangular cross-section, at least the final part of the impregnation portion will also have a rectangular cross-section corresponding, at least generally, to the cross-section of the shaping portion, although the cross-section of the shaping portion may be smaller than the cross-section of the final part of the impregnation portion in at least one dimension, e.g. the cross-section of the shaping portion may have a shorter height than the cross-section of the final part of the impregnation portion.

In a preferred embodiment in which the cross-sectional area of the impregnation portion decreases along its length extending to the shaping portion, the impregnation portion narrows in at least one dimension in the direction of the shaping portion, i.e. at least one of the walls of the impregnation portion converges with respect to at least an opposing wall in the direction of the shaping portion. For example, if the cross-section of the impregnation portion is generally circular, all of the walls may converge, so that the radius of the impregnation portion decreases. Alternatively, if the cross-section of the impregnation portion is generally square or rectangular, the upper and lower walls may converge, so that the height of the impregnation portion decreases, and/or the side walls may converge, so that the width of the impregnation portion decreases. Where both the upper and lower walls and the side walls converge, the degree of convergence may differ, for example the upper and lower walls may converge to a greater degree than the side walls. Similarly, where two walls converge, the angle of each wall with respect to the central axis of the impregnation portion may vary; for example, one wall may remain generally parallel to the central axis of the impregnation portion while the opposing wall is angled with respect to the central axis, or, preferably, both opposing walls converge to the same degree with respect to the central axis.

The degree to which two opposing walls converge may be constant along the length of the impregnation portion or may vary, and where the degree of convergence varies this may be regular or irregular. For example, at least two opposing walls of the impregnation portion may converge at a fixed angle in the direction of the shaping portion along part or substantially all of the length of the impregnation portion. Alternatively, at least two opposing walls of the impregnation portion may converge in a generally continuous curve in the direction of the shaping portion along part or substantially all of the length of the impregnation portion.

In a further alternative, at least two opposing walls of the impregnation portion may converge in a series of two or more linear segments of different angles with respect to the axis of the impregnation portion in the direction of the shaping portion, along part or substantially all of the length of the impregnation portion. In this embodiment, the angles of the linear segments with respect to the axis of the impregnation portion preferably reduce in the direction of the shaping portion, i.e. the angle at which the two opposing walls converge reduces in the direction of the shaping portion along its length. For example, the upper and lower walls of the impregnation portion may both converge in a first section at an angle with respect to the axis of the impregnation portion of from greater than 2° to 5° (such as 3.7° or 3°), and may then both converge in a second, subsequent, section at an angle with respect to the axis of the impregnation portion of from greater than 1° to 2° (such as 1.5°), and may then both converge in a third, subsequent, portion at an angle with respect to the axis of the impregnation portion of from 0.2° to 1° (such as 0.6°). The lengths of each linear segment may be the same or different; for example, where there are 3 linear segments, the first, steepest, segment may be the longest, the second section may be of intermediate length, and the third, shallowest, segment may be the shortest, or any other combination is possible. The two or more linear segments may be adjacent to each other or may be separated by a linear segment that is generally parallel to the axis of the impregnation portion. For example, where there are 3 linear segments of different angles with respect to the axis of the impregnation portion, each angled segment may be separated from the next angled segment by a linear segment that is generally parallel to the axis of the impregnation portion. By "generally parallel" it is meant that the respective linear segments are fully parallel with the axis of the impregnation portion or vary therefrom by no more than 0.5°, such as from 0 to 0.3°.

In a preferred embodiment in which the impregnation portion narrows in at least one dimension in the direction of the shaping portion, at least two opposing walls of the impregnation portion may each include a wall section that is substantially perpendicular to the axis of the impregnation portion, so that the cross-sectional area of the impregnation portion decreases relatively sharply at this point, i.e. so that a nip point is formed. In particular, the substantially perpendicular wall sections are formed in converging opposing walls of the impregnation portion.

By substantially perpendicular to the axis of the impregnation portion it is meant that the substantially perpendicular wall sections may be at an angle of from 75° to 110° with respect to the axis of the impregnation portion, preferably from 80° to 100°, such as 85° to 95°.

The substantially perpendicular wall sections on opposing walls may be staggered with respect to each other, but are preferably generally located at the same point as each other along the length of the impregnation portion.

The substantially perpendicular wall sections may be located at any point along the length of the impregnation portion, but are preferably closer to the end of the impregnation portion adjacent to the shaping portion than to the end of the impregnation portion adjacent to the resin injection portion. For example, the substantially perpendicular wall sections may be located substantially at the end of the impregnation portion adjacent to the shaping portion, so that the nip point occurs substantially immediately before entry of the resin impregnated fibres into the shaping portion. Alternatively the substantially perpendicular wall sections may be located partially along the length of the impregnation portion, and preferably so that the walls of the impregnation portion converge before the substantially perpendicular wall sections, and continue to converge after the substantially perpendicular wall sections. For example, the nip point may be located from 50 to 500 mm from the end of the impregnation portion adjacent to the shaping portion (such as 100 mm or 200 mm), and the walls of the impregnation portion may converge at an angle of from 0.05° to 1° with respect to the axis of the impregnation portion (such as 0.14° or 0.26°) after the nip point. In a particular embodiment, the cross-sectional area of the impregnation portion may increase after the substantially perpendicular wall sections and, preferably, then decrease further. For example, the cross-sectional area of the impregnation portion may initially decrease relatively slowly in the direction of the shaping portion, may then decrease relatively sharply at a nip point, then increase after the nip point, and finally decrease further.

The presence of the substantially perpendicular wall sections, and therefore a nip point, in the impregnation portion may provide improved impregnation of the resin into the fibres, improved consistency of pull force and/or improved surface properties of the final pultruded product, and the length and position of the substantially perpendicular sections, and therefore the decrease in cross-sectional area at the nip point, may be selected accordingly. For example, where the cross-sectional shape of the impregnation portion is rectangular and the upper and lower walls converge, the length of the generally perpendicular wall sections may be 1 mm, so that the height of the impregnation portion is reduced by 2 mm at the nip point, which may be located immediately adjacent to the shaping portion, or within 300 mm thereof.

Surfacing Material Such as Peel Ply or Veil

The apparatus may also comprise one or more inlets or apertures for insertion of a surfacing material into one or more portions of the apparatus in the form of a peel ply fabric or "peel ply", or a veil which is a lightweight fabric material of weight in the range of from 5 to 40 g/m². The surfacing material may also comprise other coating equivalents in order to select the desired product surface quality. The apparatus may also include one or more guides for insertion of surfacing material. The surfacing material may be added after insertion of the fibres from above and/or below at the entrance to the device for resin impregnation or the chamber in which the device for resin impregnation is contained. Preferably first surfacing material is provided below the fibres entering the receiving portion and further surfacing material is provided above the fibres passing through the injection portion or impregnation portion. Surfacing materials can also be added in a staggered arrangement, for example downstream and upstream of resin injection, to avoid distortion of the plies as they pass through the device for shaping the resin impregnated fibre. Suitable veils for use in the present invention include polyester veils.

In addition to defining the desired surface quality for the product, the surfacing material also protects the apparatus from excessive wear and tear which may be caused by abrasive fibres, notably carbon fibres. The surfacing material may be removable from the product to achieve the desired surface quality.

The central positioning of the device for impregnating the fibre with resin ensures that the fibre is completely impregnated even if resin is injected through the surfacing material. Preferably surfacing material is not fully wet out so air can escape from the impregnated fibres. It is also preferred that the fibre, including the resin impregnated fibre is completely covered by surfacing material so that there is no direct contact of carbon fibre with the apparatus surface at any time, as this can lead to wear and tear, resulting in malfunctioning of the apparatus.

If porous surfacing materials such as porous veils or peel plies are used, resin may also be injected into the fibres through the surfacing materials, and this may be additional to, or as an alternative to, the central injection of resin. Injection of resin through the surfacing material allows for simplification of the pultrusion apparatus and/or process by obviating the need for central resin injection whilst still allowing the surfacing material to provide protection to the pultrusion apparatus or parts thereof and/or to provide a desired surface quality to the pultruded resin reinforced fibres.

Peel ply guides can also be integrated in the apparatus. For example the guides can be machined in the internal side of the apparatus at any portion in which peel ply is to be inserted. In this arrangement peel ply displacement across the width can be minimized. A low vacuum could be applied in those regions to keep the peel ply firmly in place.

Device for Shaping Resin Impregnated Fibre

The device for shaping the resin impregnated fibre is not especially limited but may comprise a die. The device may also be positioned within a chamber downstream of the device for impregnating the fibre with resin, or be positioned separately including in a separate housing. The device may also comprise a heating zone where the resin impregnated fibre can be cured. The die is preferably positioned in the heating zone. It is not necessary for the die to be stationary and can be moved back and forth along the fibre profile so that two dimensional or even three dimensional curved or other shapes can be achieved. Preferably the shaping portion is adapted to shape the resin impregnated fibre to a rectangular cross-section.

The die may also comprise heating means for heating the impregnated fibres to allow these to progress to cure.

Preferably the shaping device is centrally positioned in relation to the injection portion.

The device for pulling the fibre through the apparatus is not especially limited but may be any means such as a pull mechanism or pullers that pull the fibre through the apparatus.

Pultrusion Process

The process according to the invention is preferably a continuous process which comprises inserting fibre into an apparatus comprising a portion for receiving fibres, a portion for injecting resin into the fibres, a portion for impregnating the resin injected fibres and a portion for shaping the impregnated fibres, impregnating the fibres with resin in the resin impregnation portion, shaping the resin impregnated fibre and pulling the fibre through the apparatus. The process may comprise injecting resin centrally within the resin injection portion. This helps to ensure that the fibre is completely impregnated with resin. The inserted fibres converge in the resin injection portion so that the resin can penetrate or wet them out more efficiently, and progress from a receiving portion through injection and impregnation portions to the shaping portion. Additional resin may also be injected into the fibres from the periphery, either in the resin injection portion or downstream therefrom.

Resin flows outward from the injection portion as fibres progress from the injection portion through the impregnation portion. Central injection allows the resin to be impregnated into peripherally arranged fibres as they pass through the resin impregnation portion so that fibres are impregnated from the centre to their outside. This ensures that air moves only in one direction leading to more efficient impregnation.

In an alternative embodiment, the process of the present invention may comprises injecting resin into the fibres from the periphery of the resin injection portion as an alternative to injecting resin centrally into the resin injection portion.

The process according to the invention may use the pultrusion apparatus according to the invention.

Preferably the fibre is carbon fibre and/or the resin is polyurethane. The throughput rate of the fibre in the apparatus is in the range of 0.1 to 10 metres/minute, preferably 0.25 to 5 metres/minute, more preferably 0.5 to 2.5 metres/minute, even more preferably 0.5 to 1.2 metres/minute and/or combinations of the aforesaid ranges. The resin flow rate is in the range of 0.05 to 1.0 kg/minute, preferably from 0.1 to 0.5 kg/minute, more preferably from 0.1 to 0.4 kg/minute, and/or combinations of the aforesaid ranges. The process also preferably takes place in an acclimatized room where there is low air moisture content. Preferably, the climate controlled room has a relative humidity in the range of from 10 to 80%, preferably from 20% to 65%, more preferably from 40 to 65% as measured in accordance with ASTM E337. In combination with the throughput rate this helps prevent the effects of moisture on the resin formulation. Air or moisture in resin such as polyurethane makes it foam which can lead to voids in the laminated product.

The impregnation zone may be cooled to increase the time to cure of the resin matrix. As required, this may be necessary for low throughput speeds or for high throughput speeds as the bulk of resin is increased.

The process may also further comprise adding a surfacing material such as a peel ply or a veil to the fibre before shaping the resin impregnated fibre. The surfacing material may be added after insertion of the fibres in the fibre receiving portion and before and/or during and/or after resin injection and/or resin impregnation. Surfacing material can be added in a staggered arrangement, for example downstream and upstream of resin injection, to avoid distortion of the plies as they pass through the shaping stage. By using porous surfacing material, such as porous veils or peel plies, resin may be injected into the fibres through the surfacing material, and this may be in addition to, or as an alternative to, central injection of resin into the fibres.

In a particular embodiment, the fibre, including the resin impregnated fibre, is completely covered by surfacing material, such as peel ply or an equivalent, so that there is no direct contact of carbon fibre with the pultrusion apparatus surface at any time which can lead to wear and tear and malfunctioning of the apparatus.

The resin impregnated fibre may pass into a cooling zone just before or at the beginning of the shaping portion which may be performed by a die. The die may be heated or may be located in or next to a heating zone, whereby the resin impregnated fibre can be cured. Preferably this step is conducted at a temperature in the range of 150-250° C., preferably 170-200° C.

Pultruded Product

The pultruded product obtained from the use of the pultrusion apparatus or method of the present invention may comprise 55 to 65% fibre volume fraction, preferably carbon fibre, and 25 to 35% resin content, preferably polyurethane.

The product may also comprise one or more of the following properties:
  (i) average thickness of 1.5 to 15.5 mm, preferably 4.5 to 10 mm, more preferably 4.5 to 5.5 mm, most preferably 4.9 to 5.0 mm, or alternatively 1 to 10 mm; and/or
  (ii) fibre alignment of −2° to 2°; and/or
  (iii) mean modulus tension and compression of at least 133 GPa according to ISO 527 and ISO 14126; and/or
  (iv) compression modulus of at least 127 GPa according to ISO 14126; and/or
  (v) linear tensile strain to failure of at least 0.94% according to ISO 527; and/or
  (vi) linear compression strain to failure of at least 0.69% according to ISO 14126; and/or
  (vii) inter laminar shear strength of at least 52 MPa according to ISO 14130.

The pultruded product may have uses in a number of fields such as the aerospace or energy industries and has particular use in wind turbines.

Overall, the present invention therefore provides:
1. A pultrusion apparatus comprising:
   a) a portion for receiving fibres
   b) a portion for injecting resin into the fibres
   c) a portion for impregnating the resin injected fibres, and
   d) a portion for shaping the impregnated fibres,
wherein the fibres following their passage through the receiving portion converge in the resin injection portion to receive the resin and the resin flows outwards following injection as the fibres progress from the injection portion through the impregnation portion.
2. The apparatus according to 1, wherein the resin injection portion comprises a resin injection device.
3. The apparatus according to 1 or 2, wherein the resin injection device is positioned centrally or at an angle of 0.5 to 2.5°, preferably 0.9 to 1.1° relative to the longitudinal direction of movement of the fibres in the impregnation portion.
4. The apparatus according to any of the preceding, wherein the fibres converge in an injection zone adjacent the injection device.
5. The apparatus according to 4, wherein the injection device guides the fibres to the injection zone.
6. The apparatus according to any of 4 or 5, wherein the resin flows from the injection zone outwards as the fibres progress from the injection portion through the impregnation portion.
7. The apparatus according to any of the preceding, wherein the injection portion and the impregnation portion and optionally the shaping portion are integrated.
8. The apparatus according to any of the preceding, wherein the resin injection portion and the resin impregnation portion are integrated to form a chamber.
9. The apparatus according to 8, wherein surfacing material is provided in one or more of: the receiving portion, the injection portion, impregnation portion, or shaping portion, preferably first surfacing material is applied in the receiving or injection portion and a further surfacing material is provided in the impregnation portion.
10. The apparatus according to 8 or 9, wherein surfacing material comprises peel ply or a veil, said material being provided between a chamber wall and the fibres, preferably first surfacing material is provided below the fibres entering the receiving portion and further surfacing material is provided above the fibres passing through the injection portion or impregnation portion.
11. The apparatus according to any of the preceding, wherein the injection portion comprises a device for injecting the inserted fibre with resin.
12. The apparatus according to any of the preceding, wherein the shaping portion comprises a device or die for shaping the resin impregnated fibre, said device or die optionally comprising heating means for curing the impregnated fibres.
13. The apparatus according to any of the preceding, wherein the receiving portion comprises an inlet for locating the fibre in relation to the injection portion.
14. The apparatus according to 13, wherein the inlet comprises apertures for receiving fibres in the form of fibre tows.
15. The apparatus according to any of 11 to 14, wherein the resin injection device is positioned centrally within the injection portion.
16. The apparatus according any of 12 to 15, wherein the shaping device and/or inlet is centrally positioned in relation to the injection portion.
17. The apparatus according to any of 13 to 16, wherein the inlet comprises openings of varying size, preferably the openings are provided in an oscillating lattice arrangement.
18. The apparatus according to 17, wherein the inlet comprises oscillating combs arranged at 90° to one another.
19. The apparatus according to any of the preceding, wherein the apparatus comprises a further resin injection portion, the further injection portion being positioned downstream from the first injection portion.
20. The apparatus of 19, wherein the impregnation portion and/or further resin injection portion comprises a further resin injection device.
21. The apparatus according to any of the preceding, wherein the impregnation portion comprises a cooling zone for cooling the resin.
22. The apparatus according to any of the preceding, wherein the apparatus further comprises an aperture for inserting peel ply into one or more portions.
23. The apparatus according to any of the preceding, wherein the fibre is carbon fibre and the fibres are in the form of tows.

24. The apparatus according to any of the preceding, wherein the resin is polyurethane.
25. The apparatus according to any of the preceding wherein the shaped fibre is covered in peel ply.
26. The apparatus according to any of the preceding, wherein the receiving portion, injection portion, impregnating portion and shaping portion are arranged so that the fibres progress through the respective portions consecutively.
27. The apparatus according to any of the preceding, wherein the shaping portion is adapted to shape the resin impregnated fibre to a rectangular cross-section.
28. An inlet or inlet plate for a pultrusion apparatus, wherein the inlet comprises one or more openings of varying size, preferably said openings being arranged in an oscillating lattice.
29. The inlet according to 28, wherein the inlet or inlet plate comprises oscillating combs arranged at 90° to one another.
30. The inlet according to 28 or 29 for the pultrusion apparatus according to any of 1 to 24.
31. A process for manufacturing pultruded resin reinforced fibres, comprising the steps of
   a) receiving fibres in a fibre receiving portion of an apparatus,
   a) injecting resin into the fibres in a resin injection portion of said apparatus,
   b) impregnating the resin injected fibres in an impregnation portion of said apparatus, and
   c) shaping the impregnated fibers into a pultrusion in a shaping portion or die portion,
wherein the received fibres converge in the resin injection portion.
32. The process of 31, wherein the fibres progress from the receiving portion through the injection and impregnation portions to the shaping portion.
33. The process of 31 or 32, wherein the fibres converge in an injection zone adjacent the injection device.
34. The process of 33, wherein the injection portion comprises an injection device, said device guiding the fibres to the injection zone.
35. The process of 33 or 34, wherein the resin flows from the injection zone outwards as fibres progress from the injection portion through the impregnation portion.
36. The process of any of 31 to 35, wherein the process comprises providing peel ply in one or more of: the injection portion, impregnation portion, or shaping portion.
37. The process of 36, wherein the portions form a chamber, the process comprising providing the peel ply between a chamber wall and the fibres.
38. The process of any of 31 to 37 wherein the process comprises the step of pulling the fibres preferably in the form of fibre tows through the respective portions in consecutive order.
39. The process of any of 31 to 38, wherein the fibres in the form of tows are spaced and located in the receiving portion.
40. The process according to any of 31 to 39, wherein the process further comprises adding surfacing material to the fibre before shaping the resin impregnated fibre.
41. The process according to 40 wherein the impregnated fibre is fully covered in surfacing material.
42. The process according to 40 or 41, wherein the surfacing material is not fully wet out, preferably less than 90% wet out, or more preferably between 50 and 90% wet out, even more preferably from 30 to 70% wet out and/or combinations thereof as determined by calculating the ratio of unimpregnated surfacing material to wet out surfacing material.
43. The process according to any one of 31 to 42, wherein the resin flow rate is in the range of 0.05 to 1 kg/minute, preferably from 0.1 to 0.5 kg/minute, more preferably from 0.1 to 0.4 kg/minute and/or combinations of the aforesaid ranges.
44. The process according to any of 31 to 43, wherein the through put rate of the fibre in the portions is in the range of 0.1 to 2.5 metres/minute, preferably 0.5 to 1.2 metres/minute.
45. The process according to any of 31 to 44, wherein the process further comprises cooling the resin impregnated fibre before shaping the resin impregnated fibre.
46. The process according to any of 31 to 45, wherein the shaped resin impregnated fibre is cured at a temperature in the range of 150-250° C., preferably 170-200° C.
47. The process according to any of 31 to 46, wherein the process takes place in an climate controlled room having a relative humidity in the range of from 10 to 80%, preferably from 20% to 65%, more preferably from 40 to 65% and/or combinations of the aforesaid values as measured in accordance with ASTM E337.
48. The process according to any of 31 to 47, wherein the process uses the apparatus according to any of 1 to 30.
49. A pultruded product obtainable from the process according to any of 31 to 47 or by means of an apparatus according to any of 1 to 30.
50. The pultruded product according to 49, wherein the product comprises 55 to 85% fibre volume fraction and 15 to 45% resin content, preferably from 60 to 75% fibre volume fraction and from 40 to 25% resin content and/or combinations of the aforesaid ranges as determined by ASTM D3171.
51. The pultruded product according to 49 or 50, wherein the product comprises one or more of the following properties:
   (i) average thickness of 1.5 to 15.5 mm, preferably of 4.5 to 5.5 mm, more preferably of 4.9 to 5.0 mm, even more preferably from 4.5 to 10 mm; and/or
   (ii) fibre alignment of −2° to 2°; and/or
   (iii) mean modulus tension and compression of at least 133 GPa according to ISO 527 and ISO 14126; and/or
   (iv) compression modulus of at least 127 GPa according to ISO 14126; and/or
   (v) linear tensile strain to failure of at least 0.94% according to ISO 527; and/or
   (vi) linear compression strain to failure of at least 0.69 according to ISO 14126; and/or
   (vii) inter laminar shear strength of at least 52 MPa according to ISO 14130.
52. Use of the pultruded product according to any of 49 to 51 in wind turbines.
53. The apparatus according to any preceding wherein the impregnation zone has a smaller volume or dimensions than the injection zone, preferably wherein the impregnation zone is followed by a buffet zone of gradually increasing volume or dimensions.
54. The apparatus according to any preceding wherein surface material, such as peel ply, guides are integrated in the apparatus, preferably machined in the internal side of the apparatus.

The invention will now be clarified by way of example only and with reference to the accompanying drawings in which.

Figure 1:
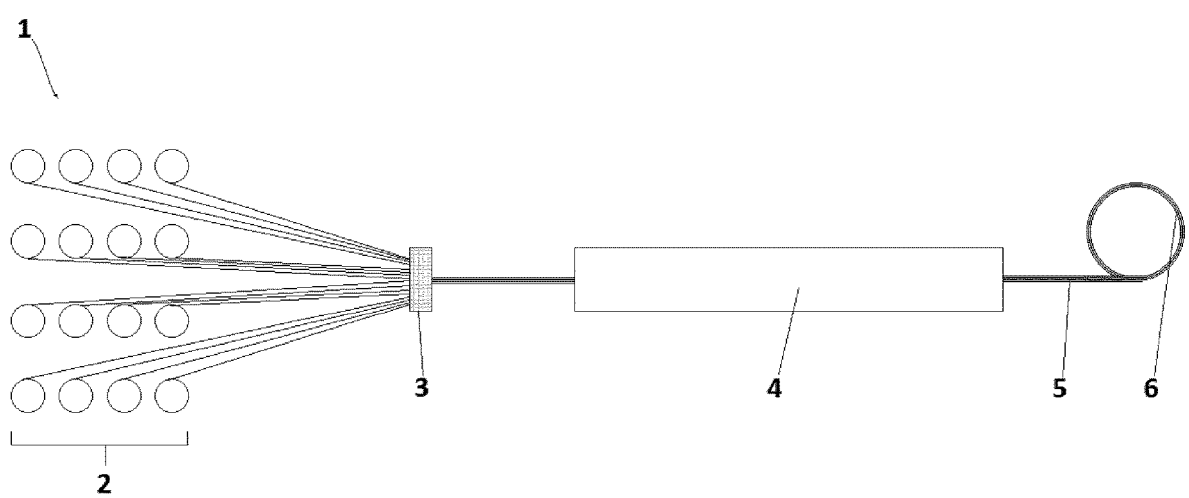
FIG. 1 is a pultrusion apparatus in accordance with an embodiment of the present invention.
Figure 4:
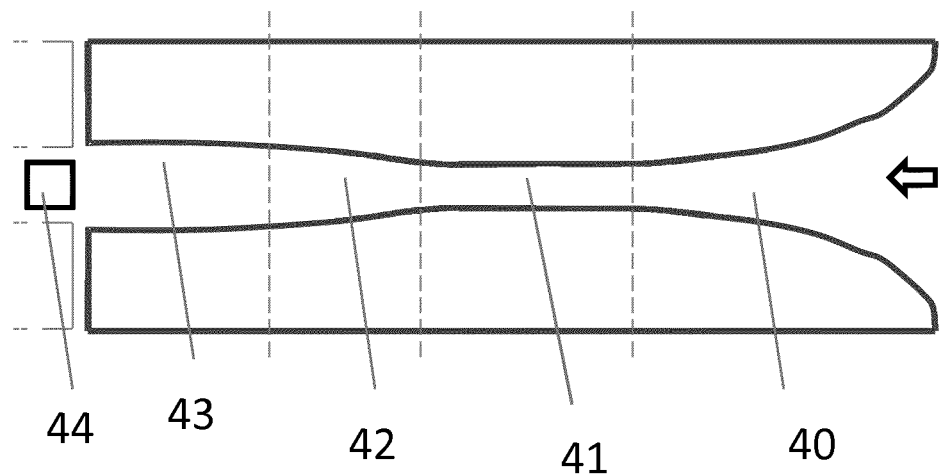
Figure 5:
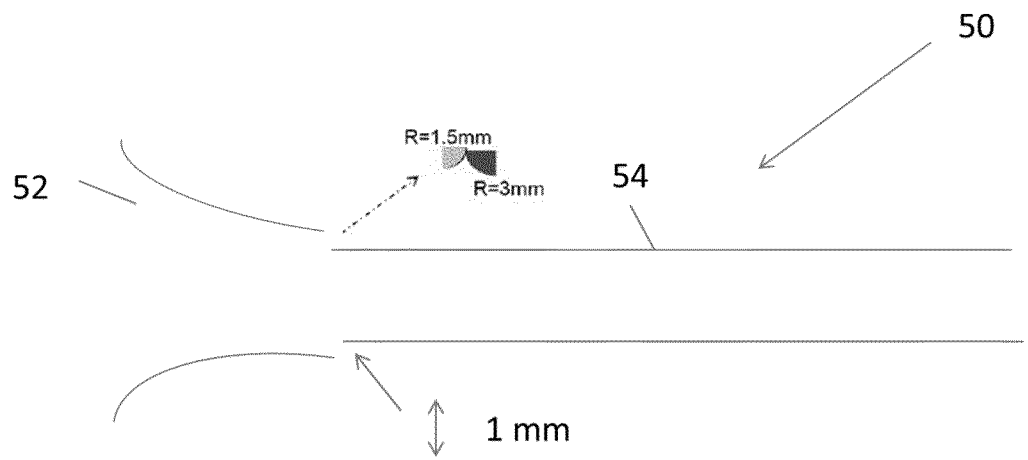

FIG. 4 is another pultrusion apparatus in accordance with an embodiment of the present invention; and FIG. 5 is another pultrusion apparatus in accordance with an embodiment of the present invention In FIG. 1 is shown a pultrusion process 1 comprising a pultrusion apparatus 3,4 which comprises a portion 3 for receiving fibre tows from a creel 2, and a portion 4 for injecting resin into the fibres, impregnating the resin injected fibres, and shaping the impregnated fibres. Portion 4 is in the form of an integrated chamber in which the fibres meet or converge in a resin injection zone. The shaped impregnated fibres 5 are cured in the chamber 4 and then are wound onto a roll 6.

Receiving portion 3 is in the form of a spreader or inlet which comprises multiple apertures, each aperture receiving a fibre tow. The apertures are spaced and they are located so as to guide the fibre tows to converge in the resin injection zone.

Figure 2:
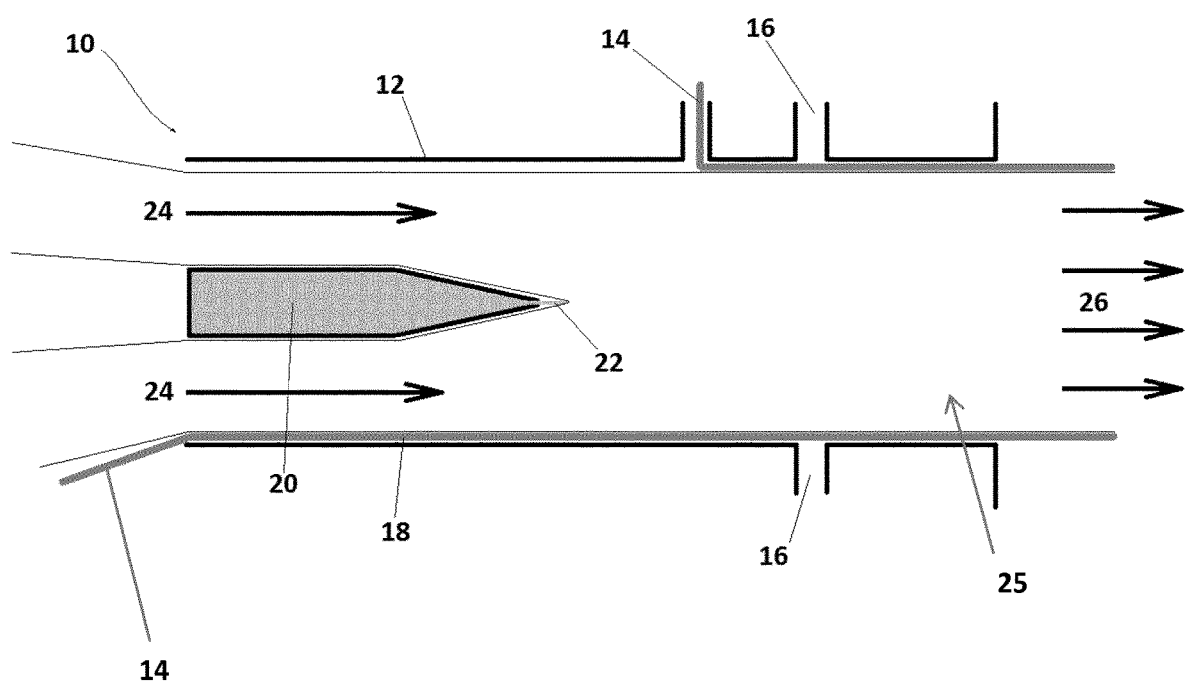
FIG. 2 is another pultrusion apparatus in accordance with an embodiment of the present invention.

Details of a pultrusion apparatus in accordance with an embodiment of the present invention 10 are shown in FIG. 2. The apparatus 10 comprises a portion 24 for receiving fibres, a portion 22 for injecting resin into the fibres, a portion 25 for impregnating the resin injected fibres, and a portion 26 for shaping the impregnated fibres. The fibres converge in the resin injection portion 22.

The resin is injected by a resin injector 20 which injects the resin at the point of the converging fibres.

The portions 24, 22, 25 and 26 are integrated to form a chamber 12. Surfacing material, such as a veil or peel ply 14 is conducted into the chamber 12 at the receiving portion 24 and in the impregnation portion 25. The chamber 12 comprises additional resin injection ports 16 which are adapted to inject resin through the peel ply layers 14. These ports 16 can also be closed.

The die or shaping portion 26 shapes the impregnated fibres. This portion 26 further comprises heating means to heat the shaped fibres, which allows them to progress to cure.

In use, fibres are drawn through the chamber 12 whilst resin is injected centrally in the injection zone 22 at the point of the converging fibres. As the fibers move through the chamber, they are compressed forcing the resin to flow from the centre of the chamber 12 outwards towards its walls, thereby impregnating the fibres in portion 25. The impregnated fibers are then shaped by the shaping or die portion 26 and are subsequently cured.

Figure 3:
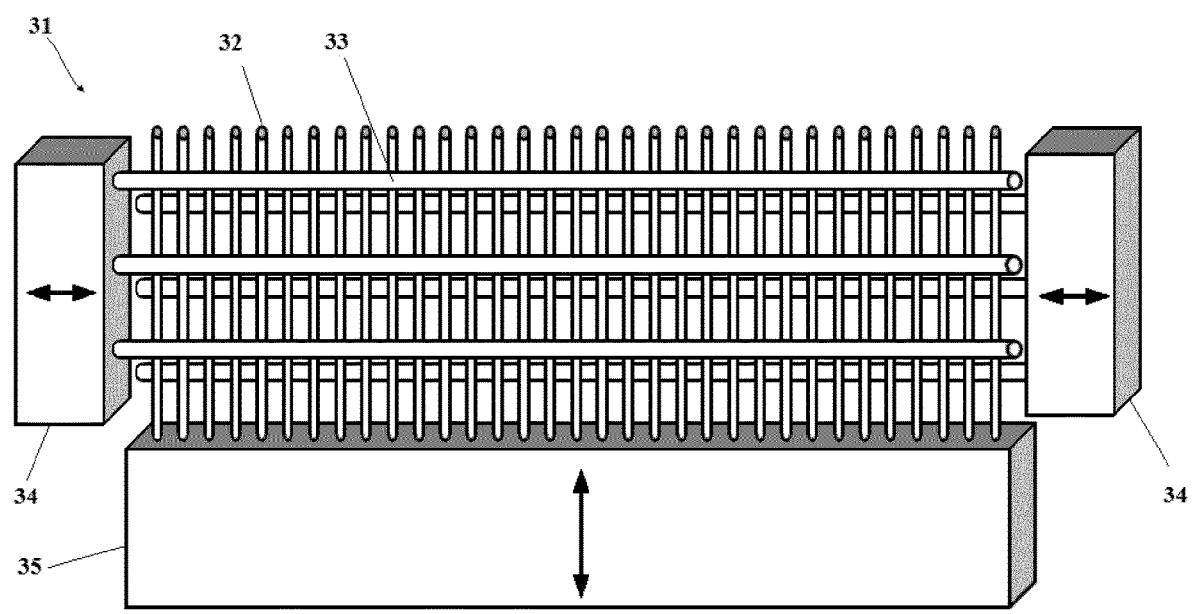
FIG. 3 is a spreader or inlet for a pultrusion apparatus in accordance with another embodiment of the present invention.

FIG. 3 shows an example of a receiving portion in the form of an inlet 31. The fibre tows are arranged to flow through apertures in moving combs 32,33. Movement of the combs 32,33 is controlled by a horizontal movement motor 34 and a vertical movement motor 35.

The moving combs 32,33 prevent the fibres from fuzzing and promote flow of the tows through the pultrusion apparatus.

FIG. 4 shows a pultrusion apparatus in accordance with another embodiment of the present invention. Fibres are injected under low vacuum through an injection portion 40. Fibres and then resin are forced to pass through an impregnation zone of smaller volume 41 so that resin is squeezed into the fibres. The degree of impregnation increases with the pressure with which the resin is forced into the fibres. The apparatus comprises a buffer zone 42 having a volume which is increased in relation to both the preceding and following sections of the apparatus. This buffer zone merges into the final geometry 43 of the impregnation zone and then the shaping zone, which is a die 44.

In a further embodiment the buffer zone may be connected to a reduced pressure in comparison to the pressure within the die or injection portion of the apparatus, or to atmospheric pressure or to a pressure which is below atmosphere.

In FIG. 5, an injection apparatus in accordance with another embodiment of the present invention 50 is shown which comprises an impregnation portion 52 and a shaping portion in the form of a die 54. The upper and lower walls of the impregnation portion 52 converge in the direction of the shaping portion or die 54, and the impregnation portion 52 is connected to the die portion 54 at a connection point, which has a point of contact between the impregnation portion 52 and the die portion 54. The upper and lower walls of the impregnation portion 52 each include a substantially vertical section at the connection point with the die 54, the vertical sections being substantially perpendicular to the axis of the die 54. The substantially vertical sections of the upper and lower walls of the impregnation portion 52 each have a length of 1 mm, so that the impregnation portion 52 and the die portion 54 have a total height difference at the connection point of 2 mm. Alternatively, the substantially vertical sections of the upper and lower walls of the impregnation portion 52 each have a length of 1.2 mm, so that the impregnation portion 52 and the die portion 54 have a total height difference at the connection point of 2.4 mm

The invention claimed is:

1. A pultrusion apparatus comprising:
   a) a portion for receiving fibres,
   b) a portion for injecting resin into the fibres,
   c) a portion for impregnating the resin injected fibres, and
   d) a portion for shaping the impregnated fibres,
wherein the fibres, following their passage through the receiving portion, converge in the resin injection portion to receive the resin, and the resin flows outwards following injection as the fibres progress from the injection portion through the impregnation portion;
wherein the fibre receiving portion comprises an inlet comprising openings of varying size in an oscillating lattice arrangement, wherein the inlet comprises oscillating combs arranged at 90° to one another.

2. The apparatus according to claim 1, wherein the resin injection portion comprises a resin injection device, wherein the fibres converge in an injection zone adjacent the injection device.

3. The apparatus according to claim 1, wherein the injection portion and the impregnation portion are integrated to form a chamber.

4. The apparatus according to claim 1, wherein the impregnation portion reduces in cross-sectional area along its length extending to the shaping portion.

5. The apparatus according to claim 4, wherein at least two opposing walls of the impregnation portion converge in a generally continuous curve along its length.

6. The apparatus according to claim 4, wherein at least two opposing walls of the impregnation portion converge in a series of two or more linear segments of different angles with respect to the axis of the impregnation portion along its length.

7. The apparatus of claim 4, wherein at least two opposing walls of the impregnation portion each include a wall section that is substantially perpendicular to the axis of the impregnation portion.

8. The apparatus of claim 7, wherein the substantially perpendicular wall sections are located substantially at the end of the impregnation portion and adjacent to the shaping portion.

9. The apparatus of claim 7, wherein the substantially perpendicular wall sections are located partially along the length of the impregnation portion.

10. The apparatus according to claim 1, wherein the injection portion comprises a resin injection device positioned centrally within the injection portion and wherein the shaping portion comprises a shaping device and/or the receiving portion comprises an inlet for locating the fibre in relation to the injection portion, and wherein the shaping device and/or inlet is centrally positioned in relation to the injection portion.

11. The apparatus according to claim 1, wherein the injection portion comprises at least one resin injection nozzle and wherein the at least one resin injection nozzle is flat, wide, large aspect ratio, circular or slot-like in shape.

12. The apparatus according to claim 1, wherein the apparatus further comprises an aperture for inserting surfacing material into one or more portions.

\* \* \* \* \*